US010160864B2

(12) United States Patent
Endle et al.

(10) Patent No.: US 10,160,864 B2
(45) Date of Patent: Dec. 25, 2018

(54) POLYURETHANE AEROSOL COMPOSITIONS, ARTICLES, AND RELATED METHODS

(71) Applicant: 3M INNOVATIVE PROPERTIES COMPANY, St. Paul, MN (US)

(72) Inventors: Susan M. Endle, New Richmond, WI (US); Jon P. Nietfeld, Woodbury, MN (US); Yongshang Lu, Woodbury, MN (US); Richard G. Hansen, Mahtomedi, MN (US); Suresh S. Iyer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 15/321,085

(22) PCT Filed: Jun. 15, 2015

(86) PCT No.: PCT/US2015/035729
§ 371 (c)(1),
(2) Date: Dec. 21, 2016

(87) PCT Pub. No.: WO2015/200014
PCT Pub. Date: Dec. 30, 2015

(65) Prior Publication Data
US 2017/0198150 A1 Jul. 13, 2017

Related U.S. Application Data

(60) Provisional application No. 62/016,221, filed on Jun. 24, 2014.

(51) Int. Cl.
| | | |
|---|---|---|
| *B05D 1/02* | (2006.01) | |
| *C09D 5/02* | (2006.01) | |
| *C09D 175/12* | (2006.01) | |
| *C09D 7/63* | (2018.01) | |
| *C08G 18/48* | (2006.01) | |
| *C08G 18/75* | (2006.01) | |
| *C08G 18/08* | (2006.01) | |
| *C08G 18/10* | (2006.01) | |

(52) U.S. Cl.
CPC .............. *C09D 5/021* (2013.01); *B05D 1/02* (2013.01); *C08G 18/0823* (2013.01); *C08G 18/10* (2013.01); *C08G 18/4825* (2013.01); *C08G 18/758* (2013.01); *C09D 7/63* (2018.01); *C09D 175/12* (2013.01); *B05D 2503/00* (2013.01)

(58) Field of Classification Search
CPC ...... B05D 1/02; B05D 2503/00; C08G 18/10; C08G 18/3212; C08G 18/3228; C08G 18/3231; C08G 18/348; C08G 18/0823; C08G 18/4825; C08G 18/758; C09D 175/12; C09D 5/021; C09D 7/63

USPC ........................................................ 427/421.1
See application file for complete search history.

(56) References Cited

U.S. PATENT DOCUMENTS

| | | |
|---|---|---|
| 4,066,591 A | 1/1978 | Scriven |
| 4,147,679 A | 4/1979 | Scriven |
| 4,968,735 A | 11/1990 | Page |
| 6,046,295 A | 4/2000 | Frisch, Jr. |
| 6,289,642 B1 | 9/2001 | Diamon |
| 6,303,665 B1 | 10/2001 | Helber et al. |
| 6,383,644 B2 | 5/2002 | Fuchs |
| 6,607,831 B2 | 8/2003 | Ho |
| 6,713,522 B2 | 3/2004 | Zhang |
| 6,822,012 B1 | 11/2004 | Baumgart |
| 6,903,156 B2 | 6/2005 | Müller |
| 7,091,280 B2 | 8/2006 | Rische |
| 8,263,231 B2 | 9/2012 | Mesa |
| 8,637,595 B2 | 1/2014 | Wuerch |
| 9,572,868 B2 | 2/2017 | Schönberger et al. |
| 2005/0027024 A1 | 2/2005 | Zhang |
| 2005/0148753 A1 | 7/2005 | Nguyen-Kim et al. |
| 2010/0055471 A1* | 3/2010 | Fuhry ................ C08G 18/0823 428/419 |
| 2011/0091712 A1* | 4/2011 | Muenter ............ C08G 18/0823 428/304.4 |
| 2012/0183692 A1 | 7/2012 | Becker, IV |
| 2012/0201982 A1 | 8/2012 | Stewart et al. |

(Continued)

FOREIGN PATENT DOCUMENTS

| | | | |
|---|---|---|---|
| WO | WO97/034954 | 9/1997 | |
| WO | WO07/108905 | 9/2007 | |
| WO | WO13/003404 | 1/2013 | |
| WO | WO-2013045403 A1 * | 4/2013 | ............. A61L 15/26 |

OTHER PUBLICATIONS

Coogan, Richard G. (1997), Post-crosslinking of water-borne urethanes. *Progress in Organic Coatings*, 32, 51-63.

*Primary Examiner* — Alexander M Weddle

(57) ABSTRACT

Provided are one-part, shelf-stable polyurethane aerosol compositions, and related articles and methods. When sprayed onto a substrate and dried, these compositions provide polyurethane films. These polyurethane films display improved moisture resistance, optical clarity, and weatherability compared to known aerosol compositions, particularly in adverse environmental conditions. The compositions generally include an aqueous polyurethane dispersion containing a urethane moiety obtained by reacting (i) a polyol or thiol having isocyanate-reactive functional groups, (ii) a neutralized water-solubilizing compound, and (iii) a diisocyanate and optionally a silane terminal group; a propellant; and optionally one or more additives.

19 Claims, No Drawings

(56) References Cited

U.S. PATENT DOCUMENTS

2012/0259061 A1* 10/2012 Felice ................ C08G 18/6659
                                                                524/591
2013/0032281 A1    2/2013  Van Den Berg
2014/0234284 A1*  8/2014  Schonberger ........... A61L 15/26
                                                                424/94.1

* cited by examiner

POLYURETHANE AEROSOL COMPOSITIONS, ARTICLES, AND RELATED METHODS

CROSS REFERENCE TO RELATED APPLICATIONS

This application is a national stage filing under 35 U.S.C. 371 of PCT/US2015/035729 filed Jun. 15, 2015, which claims the benefit of U.S. Provisional Patent Application No. 62/016,221, filed Jun. 24, 2014, the disclosures of which are incorporated by reference in their entirety herein.

FIELD OF THE INVENTION

Provided are sprayable polyurethane compositions and related articles and methods. The sprayable polyurethane compositions are, more particularly, polyurethane aerosol compositions.

BACKGROUND

Polyurethanes are synthetic polymers found in widespread commercial and industrial applications. These polymers, characterized by their carbamate (—NH—CO—O—) chemical linkages, are made by methods known in the art, for example by reacting a multifunctional isocyanate with a diol or polyol in the presence of a suitable catalyst. Thermoplastic polyurethanes are characterized by linear polymeric chains that form self-ordering block structures, while thermoset polyurethanes form covalently-bonded cross-linked networks. Through judicious selection of the diisocyanate and diol or polyol constituents, a polyurethane can be engineered to resist degradation from moisture and chemicals while also displaying great flexibility and toughness.

The aforementioned properties make polyurethane coatings and films particularly useful in harsh outdoor environments. In many applications, polyurethane coatings can fulfill decorative purposes while also protecting underlying substrates from environmental weathering, chemical exposure, heat, and/or abrasion. Use of polyurethanes in protective film applications has been described, for example, in U.S. Pat. No. 6,607,831 (Ho et al.) and U.S. Pat. No. 6,383,644 (Fuchs).

Modernly, polyurethane films can be coated onto a substrate by aerosol spraying. Aerosol spraying involves enclosing a liquid composition and a volatile propellant in a common container, then using the positive pressure generated by the propellant to drive the composition from the container. For example, the 3M brand Paint Defender Spray Film uses a polyurethane composition that can be sprayed onto an exterior surface of a vehicle and then dried to form a clear and durable protective coating. Aerosol products are attractive to endusers because they are easy to use, shelf-stable, do not require mixing, and can lay down very smooth and uniform films.

SUMMARY

Notwithstanding their many advantages, polyurethane aerosol compositions can also be limited by certain technical problems. In particular for aqueous polyurethane aerosol compositions, a primary problem is inadequate moisture resistance. Until the polyurethane is completely or nearly completely dried, the composition can be vulnerable to moisture uptake. Exposure to rain, washing, or even humid environments soon after initial application can cause the resulting film to lose its transparency and become hazy, or even opaque. Conventional polyurethanes also have the problematic tendency to yellow when exposed to sunlight.

Provided herein are polyurethane aerosol compositions based on aqueous polyurethane dispersions. These dispersions can be sprayed onto a substrate and provide thermoset or thermoplastic polyurethane films upon drying. These films were found to display superior moisture, thermal and ultraviolet resistance, optical clarity, and mechanical properties compared to known aerosol compositions, especially under adverse environmental conditions. For example, gravelometer ratings (as measured according to ASTM D-3170) of at least 5 are preferred and have been achieved in the final cured films. These qualities make the provided compositions well suited for outdoor applications, such as automotive paint protection films, where both aesthetics and protection from rock chips, staining, and debris are valued. Advantageously, these polyurethane films were also found to show robust adhesion onto glass surfaces, while retaining an ability to be manually removed from the substrate at the end of their life cycle.

In a first aspect, a polyurethane aerosol composition is provided, the composition comprises: a polymer obtained by reacting (i) a polyol or thiol having isocyanate-reactive functional groups; (ii) a neutralized water-solubilizing compound; (iii) a diisocyanate; and (iv) an isocyanate-reactive chain extender comprising hydrazine or a hydrazide; water; and a propellant, wherein the composition forms a translucent or transparent film when deposited on a substrate.

In a second aspect, a polyurethane aerosol composition is provided, comprising: a urethane moiety obtained by reacting (i) a polyol or thiol having isocyanate-reactive functional groups; (ii) a neutralized water-solubilizing compound; and (iii) a diisocyanate; a silyl terminal group; water; and a propellant.

In a third aspect, a method of making a polyurethane aerosol composition is provided. The method comprises the steps of: obtaining an isocyanate-terminated polyurethane prepolymer by reacting a mixture comprising a polyol component comprising a polyol or thiol comprising two isocyanate-reactive groups and a diisocyanate; providing a solubilized polyurethane prepolymer by reacting sequentially the isocyanate-terminated polyurethane prepolymer with: (i) an acidic water-solubilizing compound; and (ii) a base to neutralize the water-solubilizing compound; dispersing the solubilized polyurethane prepolymer in water; reacting the solubilized polyurethane prepolymer with an isocyanate-reactive chain extender comprising hydrazine or a hydrazide; and adding a propellant to obtain the polyurethane aerosol composition.

In a fourth aspect, a method of providing a thermoplastic polyurethane coating on a substrate from a one-part composition is provided, the method comprising: depositing an aqueous polyurethane dispersion onto the substrate through an aerosol actuator using a propellant, the aqueous polyurethane dispersion comprising a polymer obtained by reacting: (i) a polyol or thiol having isocyanate-reactive functional groups; (ii) a neutralized water-solubilizing compound; (iii) a diisocyanate; and (iv) an isocyanate-reactive chain extender comprising hydrazine or a hydrazide; removing water from the dispersion to harden the thermoplastic polyurethane coating.

In a fifth aspect, a method of making a polyurethane aerosol composition is provided, comprising: obtaining an isocyanate-terminated polyurethane prepolymer by reacting a mixture comprising a polyol component comprising a polyol or thiol comprising two isocyanate-reactive groups and a diisocyanate; providing a solubilized polyurethane prepolymer by reacting sequentially the isocyanate-terminated polyurethane prepolymer with: (i) an acidic water-solubilizing compound; (ii) a base to neutralize the water-solubilizing compound; and (iii) a silyl terminal group; dispersing the solubilized polyurethane prepolymer in water; reacting the solubilized polyurethane prepolymer with an isocyanate-reactive chain extender; and adding a propellant to obtain the polyurethane aerosol composition.

In a sixth aspect, a method of providing a crosslinked polyurethane coating on a substrate from a one-part composition is provided, the method comprising the steps of: depositing an aqueous polyurethane dispersion onto the substrate through an aerosol actuator using a propellant, the aqueous polyurethane dispersion comprising: urethane moieties obtained by reacting (i) a polyol or thiol having isocyanate-reactive functional groups; (ii) a neutralized water-solubilizing compound; and (iii) a diisocyanate; silyl terminal groups; and water; and removing the water to condense the silyl terminal groups, thereby providing a crosslinked polyurethane coating.

In a seventh aspect, a polyurethane aerosol composition is provided comprising: a polymer obtained by reacting: (i) a polyol or thiol having isocyanate-reactive functional groups; (ii) a neutralized water-solubilizing compound; (iii) a diisocyanate; and (iv) an isocyanate-reactive chain extender; water; and a dimethyl ether propellant, wherein the polymer has a weight average molecular weight ranging from 10,000 g/mol to 200,000 g/mol.

In an eighth aspect, a method of providing a thermoplastic polyurethane coating on a substrate from a one-part composition is provided, the method comprising: depositing an aqueous polyurethane dispersion onto the substrate through an aerosol actuator using a dimethyl ether propellant, the aqueous polyurethane dispersion including a polymer obtained by reacting: (i) a polyol or thiol having isocyanate-reactive functional groups; (ii) a neutralized water-solubilizing compound; (iii) a diisocyanate; and (iv) an isocyanate-reactive chain extender; and removing water from the dispersion to harden the thermoplastic polyurethane coating, wherein the polymer has a weight average molecular weight ranging from 10,000 g/mol to 200,000 g/mol.

Definitions

As used herein:

"diol" means a compound having a hydroxyl functionality of exactly two;

"diisocyanate" means a compound having an isocyanate functionality of exactly two;

"isocyanate" refers to a compound having an —N=C=O functional group;

"polyol" refers to a compound having a hydroxyl functionality of two or more;

"polyurethane" generally refers to a polymer characterized by urethane and/or urea linkages;

"thiol" refers to an organosulfur compound having an —SH functional group;

"urea" refers to a compound having a —$NH_2CO(NH_2)$— chemical linkage; and

"urethane" refers to a compound having a —NH—CO—O— chemical linkage.

DETAILED DESCRIPTION

As used herein, the terms "preferred" and "preferably" refer to embodiments described herein that may afford certain benefits under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Particular structures, materials, or characteristics may be combined in any suitable manner in one or more embodiments.

In exemplary embodiments, the provided polyurethane aerosol compositions include a prepolymer having a urethane moiety and one or more silyl terminal groups, water, optional additives such as rheology modifiers and/or anti-foaming agents, and a propellant. These components will be examined in detail in the following sections.

Polyurethane Prepolymers and Polymers

The prepolymers described herein comprise various moieties including urethane moieties comprising polyisocyanate-derived moieties and moieties derived from polyols and/or thiols, neutralized anionic water-solubilizing moieties, monovalent terminal silyl moieties, and optionally polyurea moieties derived from difunctional hydrazine or hydrazide chain extenders, optional (e.g. polyol and/or amine) chain extender-derived moieties, as well as various other optional moieties.

In general, the silyl-terminated polyurethane dispersions are prepared by first obtaining a polyurethane prepolymer. In these embodiments, the prepolymer is prepared from at least one polyol or thiol component, at least one isocyanate-reactive water-solubilizing component, at least one polyisocyanate (e.g. a diisocyanate) component, and optionally one or more polyol and/or polyamine chain extenders. Optionally, the prepolymer is then neutralized, and partially terminated with alkoxy silane. In some embodiments, the resulting prepolymer is chain extended with a difunctional hydrazide or hydrazine compound where the remaining components are devoid of any hydrazide or hydrazine groups. The prepolymer can be dispersed in water prior to or after being chain extended with the difunctional hydrazide or hydrazine compound. During hydrolysis, the alkoxy silane groups are then converted to —Si—OH chemical groups. Upon drying the Si—OH groups condense to form siloxane linkages —Si—O—Si—.

In alternative embodiments, a polyurethane dispersion can be prepared that does not include silyl terminal groups and is thus does not form a covalently crosslinked network after being sprayed onto a substrate. These coatings can nonetheless display excellent properties, particularly where the dispersion is prepared from polymers having sufficiently high molecular weight.

In a preferred embodiment, the components of the polyurethane are selected such that the polyurethane has little or no ethylene oxide units. The polyurethane may, for example, contain less than 1 or less than 0.5 weight percent ethylene oxide moieties.

The polyurethane aerosol compositions typically have a solids content ranging from about 5 percent to about 50 percent by weight, based on the overall weight of the coated polyurethane (excluding the propellant). The solids content, in turn, can be adjusted based on the amount of water present in the dispersion. To obtain the desired solids content, water can be present in an amount of at least 50 percent, at least 60 percent, at least 65 percent, at least 67 percent, at least 70 percent, or at least 73 percent by weight, based on the overall weight of the composition excluding the propellant. The water can be present in an amount up to 95 percent, up to 90 percent, up to 87 percent, up to 85 percent, or up to 82 percent by weight, based on the overall weight of the composition excluding the propellant.

Although the polyurethane compositions are generally formed from difunctional components (e.g. diols, diisocyanates, hydrazines, dihydrazides, and diamines), multifunctional components with a functionality greater than two may optionally be incorporated into the polyurethane dispersion in limited amounts. When utilized, such multifunctional components provide branching. A urethane branching coefficient ("UBC") can express total the amount of branching provided by multifunctional polyisocyanates, polyols and chain extenders in the urethane portion of the silane-terminated urethane dispersion. This coefficient excludes siloxane linkages, such as —Si—O—Si— and —Si—OH, but includes other active hydrogen groups of the silane such as amine and mercaptan. The calculation assumes that unreacted isocyanate reacts with water. Using this measurement, the UBC typically ranges from about 1.7 to about 2.25, preferably from about 1.85 to about 2.01. In some embodiments, the UBC is 2, meaning all such components are difunctional (for example, diisocyantes and diols). Further aspects of UBC are described in U.S. Pat. No. 6,046,295 (Frisch et al.).

The polyol component comprises a compound having two isocyanate reactive functional groups (diols and derivatives thereof) and optionally further comprises a compound having greater than two isocyanate reactive groups (for example, triols, tetrols, and derivatives thereof), each isocyanate reactive group having at least one active hydrogen.

Isocyanate-reactive components such as polyols (for example, diols), thiols, and amines that may be reacted with diisocyanates to prepare the prepolymers can be divided into two groups, high molecular weight compounds and low molecular weight compounds. High molecular weight compounds can have an average molecular weight of at least 400, at least 500, at least 600, at least 700, at least 800, or at least 1000 g/mol. In some embodiments, the high molecular weight compounds have an average molecular weight of up to 9,000; up to 8,000; up to 7,000; up to 6,000, or up to 5,000 g/mol. Low molecular weight compounds (chain extenders) may have an average molecular weight of up to 400, up to 350, up to 300, or up to 250 g/mol. Optionally, the aforementioned average molecular weights are weight average molecular weights ($M_w$).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols and especially polyether polyols can be preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and may be substituted, for example, by halogen atoms, and/or contain ethylenic unsaturation. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Polyesters of lactones may also be used. Illustrative fatty acid dimer diols are available from Croda International (Snaith, UK), under the trade designation PRIPOL 2033. Fatty acid dimer-based polyester polyols are available from the same source, under the trade designation "PRIPLAST 1838".

In some embodiments, the polyurethane is prepared from an aliphatic polyester diol. Optionally, aliphatic polyester diols can be the primary or sole high molecular weight diol of the polyurethane.

Suitable polyhydric alcohols that can be used in the preparation of polyester polyols and that can also useful as low molecular weight polyol chain extenders include, for example, ethylene glycol; diethylene glycol; (1,2 or 1,3) propylene diol; (1,4 or 1,3) butane diol; (1,6) hexanediol; (1,8) octanediol; neopentyl glycol; (1,4) cyclohexanedimethanol; bis(2-hydroxyethyl) hydroquinone (HQEE); 2-methyl-1,3-propanediol; 2,2,4-trimethyl-1,3-pentanediol; triethylene glycol; tetraethylene glycol; polyethylene glycol; polypropylene glycol; dipropylene glycol; dibutylene glycol; polybutylene glycol, glycerine and trimethlyolpropane. Various mixtures of low molecular weight polyol chain extenders can be utilized.

In some embodiments, the polyurethane comprises cycloaliphatic chain extender moieties, and especially cyclohexane moieties. In other embodiments, the polyurethane comprises aliphatic $C_3$-$C_6$ alkylene diol chain extenders such as butane diol. When utilized, the concentration of polyol chain extender is typically at least 0.1, 0.2 or 0.3 weight percent and can range up 5, 6, 7, 8, 9, or 10 weight percent based on the total weight of the polyurethane.

Polycarbonates containing hydroxyl groups include products obtained from the reaction of diols such as propanediol-(1,3), butanediol-(1,4) and/or hexanediol-(1,6), diethylene glycol, triethylene glycol or tetraethylene glycol with phosgene, diaryl-carbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

In some embodiments, the polyurethane is prepared from a polycarbonate diol. Optionally, polycarbonate diols are the primary or sole high molecular weight diol of the polyurethane.

Suitable polyether polyols can be obtained by the reaction of starting compounds that contain reactive hydrogen atoms with alkylene oxides such as propylene oxide, butylene oxide, styrene oxide, tetrahydrofuran, epichlorohydrin or mixtures of these alkylene oxides. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

In some embodiments, the polyurethane is prepared from a propylene oxide and/or butylene oxide polyether diols. Propylene oxide and/or butylene oxide polyether diols can be the primary or sole high molecular weight diol of the polyurethane.

In some embodiments, the high molecular weight diol or diols are present in an amount of at least 30, at least 35, at least 40, at least 45, or at least 50 weight percent based on the total weight of the polyurethane prior to hydrolysis. In some embodiments, the high molecular weight diols are generally utilized in an amount no greater than 80, no greater than 75, no greater than 70, or no greater than 65 weight percent, based on the total weight of the polyurethane prior to hydrolysis. In exemplary embodiments, the polyurethane includes urethane moieties derived from high molecular weight diol moieties. The high molecular weight diol moieties can be present in the hydrolyzed polyurethane in approximately the same compositional ranges just described.

In addition to the above-mentioned difunctional components, small portions of trifunctional and higher functional components generally known in polyurethane chemistry, such as trimethylolpropane, may be utilized to obtain slight branching (as previously described). Although small concentrations of monofunctional end-capping isocyanate-reactive components, such as monols and monoamines, can be utilized in small concentrations, it is generally preferred that little or no monofunctional components are utilized other than the monofunctional alkoxy silane compound. The polyurethane typically comprises 0, or alternatively up to 1 or up to 0.5 weight percent of monofunctional end-capping isocyanate-reactive components other than the alkoxy silane compound.

The polyisocyanate component comprises a compound having two isocyanate groups (diisocyanates and/or adducts thereof). The polyisocyanate component may optionally comprise compounds having greater than two isocyanate groups (for example, triisocyanates and/or adducts thereof) to introduce branching, as previously described. Adducts of the polyisocyanate compounds as defined herein refer to isocyanate functional derivatives of polyisocyanate compounds and polyisocyanate prepolymers. Examples of adducts include but are not limited to those selected from the group consisting of ureas, biurets, allophanates, dimers and trimers of isocyanate compounds, uretonimediones, and mixtures thereof. Any suitable organic polyisocyanate, such as an aliphatic, cycloaliphatic, araliphatic or aromatic polyisocyanate, may be used either singly or in mixtures of two or more.

Aromatic polyisocyanates can be more reactive toward polyols and other poly(active hydrogen) compounds than aliphatic polyisocyanates. Suitable aromatic polyisocyanates include but are not limited to those selected from the group consisting of 2,4-toluene diisocyanate, 2,6-toluene diisocyanate, a dimer of toluene diisocyanate (available from Bayer AG, Leverkusen, Germany, under the trade designation DESMODUR TT), diphenylmethane 4,4'-diisocyanate, 1,5-diisocyanato-naphthalene, 1,4-phenylene diisocyanate, 1,3-phenylene diisocyanate, and mixtures thereof.

Advantageously, aliphatic isocyanates can provide better light stability than the aromatic compounds. Examples of useful cycloaliphatic polyisocyanates include, but are not limited to, those selected from the group consisting of dicyclohexylmethane diisocyanate ($H_{12}$ MDI, from Bayer AG and commercially available as DESMODUR W), isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane ($H_6$ XDI), and mixtures thereof. Examples of useful linear or branched aliphatic polyisocyanates include, but are not limited to, those selected from the group consisting of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate, 2-methyl-1,5-pentamethylene diisocyanate, dimer diisocyanate, the urea of hexamethyl diisocyanate, and mixtures thereof.

In some embodiments, the diisocyanate component comprises cyclic aliphatic moieties, such as dicyclohexylmethane moieties, as can be derived from $H_{12}$ MDI and derivatives thereof. Other cyclic aliphatic moieties include alkyl cyclohexyl, as can be derived from IPDI. Mixtures of cycloaliphatic moieties can be present.

In some embodiments, cyclic aliphatic diisocyanante(s) are generally utilized in an amount of at least 15, at least 20 or at least 25 weight percent and typically up to 50, up to 45, up to 40, or up to 35 weight percent based on the total weight of the polyurethane, prior to hydrolysis. Thus, the polyurethane comprises urethane moieties derived from cyclic aliphatic diisocyanantes. Cyclic aliphatic (e.g. diisocyanante) moieties are present in the hydrolyzed polyurethane in approximately the same compositional ranges just described.

The polyurethane prepolymer can be characterized as an isocyanate-terminated polyurethane prepolymer. The isocyanate groups of the isocyanate-terminated polyurethane prepolymer are utilized in subsequent reactions.

The polyurethane prepolymer is preferably prepared with excess isocyanate—that is, containing more than one isocyanate radical in the reaction mixture for each active hydrogen radical contributed by the isocyanate-reactive components (for example, polyol components) the anionic water-solubilizing compound, alkoxy silane compound, and other isocyanate reactive compounds in the prepolymer. "Active hydrogens" are those nucleophilic hydrogen atoms which conform to the Zerewitinoff determination of hydrogen atoms (compounds which, when reacted with a solution of methylmagnesium iodide in purified n-butyl ether, produce methane). Isocyanate reactive groups having at least one active hydrogen include hydroxyl groups (—OH), thiol groups (—SH), and amines (—$NH_2$ and —NHR, wherein R is selected from the group consisting of phenyl, straight or branched aliphatic groups comprising from about 1 to about 12 carbon atoms, and cycloaliphatic groups).

Suitable polyurethane prepolymers have a ratio between isocyanate equivalents to active hydrogen equivalents that preferably ranges from greater than 1:1 (e.g. 1.05:1) to 4:1. In some embodiments, the ratio is up to 3:1 or up to 2:1. This ratio is the highest after reacting the polyol component with the isocyanate component and declines with the subsequent addition of isocyanate reactive components.

The isocyanate-terminated polyurethane prepolymer is reacted with an anionic water-solubilizing compound. The water-solubilizing compound comprises at least one anionic water-solubilizing group and at least one isocyanate reactive functional group. In some embodiments, each compound has two isocyanate-reactive groups that are connected through an organic radical to each other and to an anionic water-solubilizing group. Suitable anionic water-solubilizing groups include carboxyl, sulfate, sulfonate, phosphate, and the like, which ionize in water when combined with a corresponding neutralization (e.g. salt-forming) compound.

Suitable anionic water-solubilizing compounds are represented by the formula $(HB)_2R^1A$, where A is an anionic water-solubilizing moiety; B is O, S, NH or NR, wherein R is an alkyl group comprising 1 to 4 carbon atoms; and $R^1$ represents a trivalent organic linking group having a valency of at least 3, typically comprising between 2 and 25 carbon atoms. Exemplary anionic water-solubilizing compounds can be found in U.S. Pat. No. 7,091,280 (Rische et al.).

Optionally, A is an anionic group such as $-OSO_3M$, $-CO_2M$, $-OPO(OM)_2$, where M is H or one equivalent of a monovalent or divalent soluble cation such as sodium, potassium, or calcium. Illustrative anionic water-solubilizing compounds include dihydroxycarboxylic acids, dihydroxysulphonic acids, dihydroxyphosphonic acids and salts thereof such as dimethylolpropionic acid, depicted as follows:

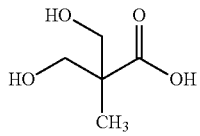

The amount of anionic water-solubilizing group is preferably sufficient to emulsify the polyurethane polymer in water. In some embodiments, the weight ratio of isocyanate groups to anionic water-solubilizing groups is at least 3:1, at least 4:1, at least 5:1 or at least 6:1, and typically up to 15:1 or up to 10:1. In some embodiments, the anionic water-solubilizing compound is present in an amount of at least 1, at least 1.5, at least 2, or at least 2.5 weight percent, and typically up to 5 weight percent based on the total weight of the polyurethane prior to hydrolysis. Thus, the polyurethane comprises urethane moieties derived from one or more anionic water-solubilizing compounds. The anionic water-solubilizing moieties are present in the hydrolyzed polyurethane in approximately the same compositional ranges as just described.

In a preferred embodiment, the anionic groups of the anionic water-solubilizing compound are neutralized prior to reacting the isocyanate-terminated polyurethane prepolymer with isocyanate-reactive silane compounds. A sufficient amount of a base, or neutralizing compound, can be used to anionically stabilize the dispersions, for example through formation of salts with the pendant (e.g. carboxylate) water-solubilizing groups on the resultant polyurethane. Examples of useful salt-forming compounds include, but are not limited to, ammonia; alkyl amines such as trimethylamine, triethylamine, tripropylamine, triisopropylamine, tributylamine, triethanolamine, and diethanolamine; and any mixtures thereof.

In preferred embodiments, at least some of the isocyanate groups of the isocyanate-terminated polyurethane prepolymer are reacted with an isocyanate-reactive silane compounds. Silane compounds containing one, two, or three hydrolyzable groups on the silicon and one organic group including an isocyanate-reactive group. An alkoxy group is the most typical hydrolyzable group.

In some embodiments, the alkoxy silane compound has the formula $(R^2O)_3SiR^3-Z$, where $R^2$ is independently either hydrogen or a $C_1$-$C_4$ alkyl (for example, a methoxy or ethoxy group); $R^3$ is a divalent group selected from alkylene, alkylarylene (for example, an alkylphenyl group), and oxyalkylene; and Z is selected from the group consisting of $-OH$, $-SH$, $-NHR^4$, and $-NH_2$, where $R^4$ is an aromatic or aliphatic cyclic group. When $R^3$ is alkylene or oxyalkylene, the group may be linear, branched, or cyclic. The alkylene or oxyalklyene group typically includes 1 to 12 carbon atoms and, in some embodiments, 2 to 3 carbon atoms.

Examples of suitable aminoalkylene alkoxysilanes include 2-aminoethyl-dimethylmethoxysilane; 6-amino-hexyl-tributoxysilane; 3-aminopropyl-trimethoxysilane; 3-aminopropyl-triethoxysilane; 3-aminopropyl-methyidi-ethoxysilane; 5-aminopentyl-trimethoxysilane; 5-aminopentyl-triethoxysilane and 3-aminopropyl-triisopropoxysilane. Examples of other isocyanate-reactive alkoxy silanes include hydroxylmethyl-triethoxysilane and 3-mercapto propyltriethoxysilane.

In some embodiments, alkoxy silane compound(s) are utilized in an amount of at least 0.1, at least 0.2, at least 0.3, at least 0.4, or at least 0.5 weight percent, and in some embodiments up to 7, up to 8, up to 9, or up to 10 weight percent based on the total weight of the polyurethane prior to hydrolysis. The polyurethane therefore comprises urethane moieties derived from one or more alkoxy silane compounds. The alkoxy silane moieties are present in the polyurethane in the same compositional ranges just described prior to hydrolysis and slightly less after hydrolysis due to the conversion of the alkoxy group to $-OH$. The silicon atom concentration can generally range from 0.015 to 1.5 weight percent of the polyurethane.

A portion of the isocyanate groups of the isocyanate-terminated polyurethane prepolymer can be chain extended with a difunctional hydrazine or hydrazide compound. Difunctional hydrazine compounds include anhydrous hydrazine has the formula $H_2N-NH_2$, as well as hydrazine hydrate that is typically 50-60% hydrazine.

Dihydrazides include for example carbodihydrazide (CDH), oxalic dihydrazide and thiocarbohydrazide, depicted as follows:

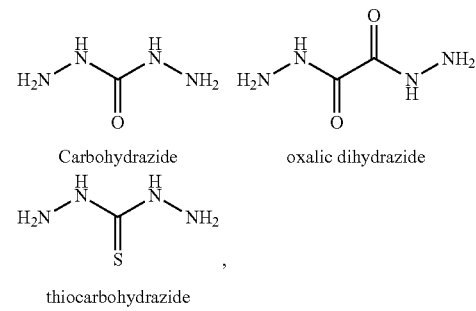

Carbohydrazide    oxalic dihydrazide thiocarbohydrazide as well as dihydrazides having the following formula:

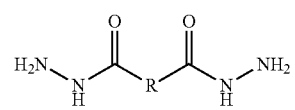

where R is a covalent bond (such as in the case of oxalic dihydrazide, a heteroatom such as nitrogen (such as in the case of imidodicarboxylic acid dihydrazide) or a polyvalent (e.g. divalent) organic radical, such as (e.g. $C_1$-$C_{18}$) alkylene, optionally comprising contiguous heteroatoms such as oxygen or nitrogen; arylene (e.g. phenyl) typically having a weight average molecular weight no greater than 500, 400, or 300 g/mol. Some illustrative dihydrazides are depicted as follows:

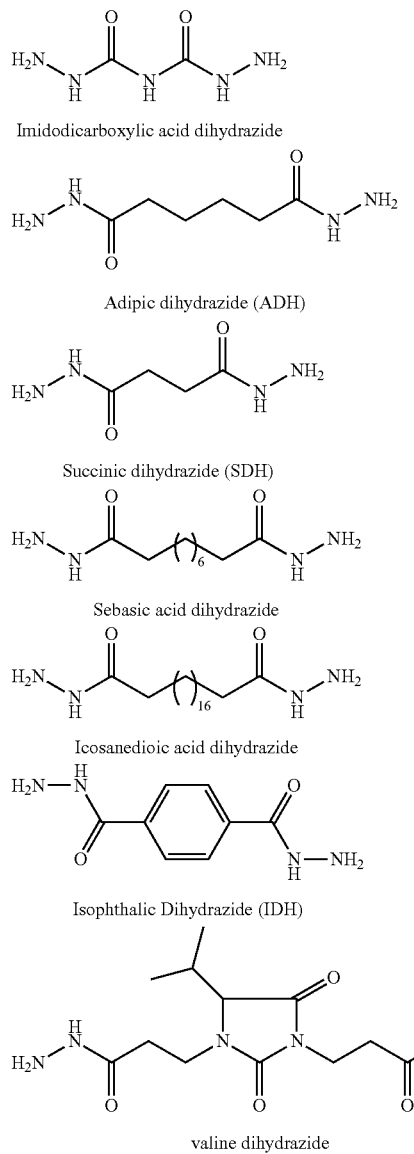

In some embodiments, hydrazine and/or dihydrazide compound(s) are present in an amount of at least 0.1, at least 0.2, at least 0.3, at least 0.4, or at least 0.5 weight percent and in some embodiments in an amount of up to 5, up to 6, up to 7, up to 8, up to 9, or up to 10 weight percent, based on the total weight of the polyurethane prior to hydrolysis. Therefore, in these embodiments, the polyurethane includes urea moieties derived from hydrazine and/or dihydrazide compounds. The hydrazine and/or dihydrazide moieties are present in the hydrolyzed polyurethane in approximately the same compositional ranges as just described.

In some embodiments, the isocyanate-terminated polyurethane prepolymer is augmented using a multifunctional (for example, difunctional) amine chain extender. Examples of useful diamine chain extenders include, but are not limited to, those selected from the group consisting of 4,4'-methylene bis(o-chloroaniline), 2,5-diethyl-2,4-toluene diamine, 4,4'-methylene bis(3-chloro-2,6-diethylaniline), propylene glycol bis(4,4'-aminobenzoate), 3,5-di(thiomethyl)-2,4-toluene diamine, methylene bis(4,4'-aniline), ethyl-1,2-di(2-amino thiophenol), 4-chloro-3,5-diamino isobutylbenzoate, 1,2-diaminoethane, 1,4-diaminobutane, 1,6-diaminohexane, N,N'-dialkyl(methylene dianiline), N,N'-dialkyl(1,4-diaminobenzene), and mixtures thereof.

In some embodiments, multifunctional amines, and especially diamine(s) chain extenders, are present in an amount of at least 0.1, at least 0.2, at least 0.3, at least 0.4 or at least 0.5 weight percent, and in some embodiments up to 5, up to 6, up to 7, up to 8, up to 9, or up to 10 weight percent, based on the total weight of the polyurethane prior to hydrolysis. In some embodiments, multifunctional amines (for example, diamines) are utilized in an amount of at least 1.0, at least 1.5, or at least 2 weight percent. Thus, the polyurethane comprises urea moieties derived from multifunctional amines (for example, diamine). The multifunctional amines (e.g. diamine) moieties are present in the hydrolyzed polyurethane is about the same compositional ranges as just described.

The polyurethane prepolymer compositions are typically prepared with a catalyst according to methods known in the art. The amount of catalyst can extend up to about 0.5 parts by weight of the isocyanate-terminated prepolymer. In some embodiments, the amount of catalyst ranges from about 0.005 to about 0.05 part by weight. Examples of useful catalysts include but are not limited to those selected from the group consisting of tin II and IV salts such as stannous octoate and dibutyltin dilaurate, and dibutyltin diacetate; tertiary amine compounds such as triethyl amine and bis (dimethylaminoethyl) ether, morpholine compounds such as 13,13-dimorpholinodiethyl ether, bismuth carboxylates, zinc-bismuth carboxylates, iron (III) chloride, potassium octoate, and potassium acetate.

Solvents can be utilized to control the viscosity of the isocyanate-terminated prepolymer. Examples of useful solvents (often volatile organic compounds) added for this purpose include but are not limited ketones (e.g. methyl ethyl ketone, acetone), tertiary alcohols, ethers, esters, amides, hydrocarbons, chlorohydrocarbons, chlorocarbons, and mixtures thereof. Such solvent are usually stripped at the end of the reaction by vacuum heating. Under laboratory conditions, a Haake Rotoevaporator or other similar equipment can be used to remove the solvent.

Solvents can also be utilized to promote the coalescence of the silyl-terminated polyurethane particles of the dispersion to form a continuous film. Examples of such coalescing solvents for use in the dispersion include but are not limited to those selected from the group consisting of n-methyl pyrrolidinone (NMP), n-butyl acetate, dimethyl formamide, toluene, methoxypropanol acetate (PM acetate), dimethyl sulfoxide (DMSO), ketones, alcohols, dimethyl acetamide, and mixtures thereof.

An isocyanate-terminated polyurethane prepolymer is prepared in a sequential step process. To a reactor equipped with a stirrer, a heater, and a dry gas purge (for example, nitrogen or argon, for example), the (e.g. high molecular weight) polyol and polyisocyanate component are added to the reactor with optional catalyst and optional solvent (e.g. anhydrous methylethyl ketone, having $H_2O$ levels of 0.05% or less). The reactor is heated to the reaction temperature (generally greater than 75° C. and up to about 100° C.) and the reaction is allowed to proceed for a period of time. This period of time is from 15 minutes to 8 hours, preferably from 30 minutes to 4 hours. Next the isocyanate reactive anionic water-solubilizing component (e.g. dimethylolpropionic acid) is added with optional solvent and the reaction is allowed to proceed for a period of time. This period of time is from 15 minutes to 8 hours, preferably from 1 hour to 6 hours, keeping the reaction exotherm below 100° C. to minimize unwanted side reactions. Optionally all or a portion of the (e.g. polyol) chain extender component can be added at this point with optional solvent and the reaction is allowed to proceed for a period of time. This period of time is from 15 minutes to 8 hours, preferably from 1 hour to 4 hours. The viscosity of the prepolymer is typically low enough (about 70,000 cps or less) to facilitate the dispersion step.

The next step is to combine the isocyanate-terminated prepolymer with a neutralizing compound (such as triethylamine) followed by reacting a portion of the isocyanate groups of the prepolymer with the isocyanate-reactive alkoxy silane compound. At least a portion of the prepolymer can be augmented with the difunctional hydrazine or hydrazide compound to form a polymer. The reaction of the prepolymer with the hydrazine or hydrazide compound can occur before or after the prepolymer is dispersed in water. Optionally, a chain extender, such as an alkylene diamine can be added to react with a portion of the remaining isocyanate groups. In one embodiment, the hydrazine/hydrazide compound is reacted before the prepolymer is dispersed in water and the optional second alkylene diamine is added after the dispersion is formed.

Following hydrolysis, the alkoxy silane groups are converted to Si—OH groups that are curable through a condensation reaction to form siloxane linkages having the formula —Si—O—Si—. The polyurethane polymer component therefore represents the basis for a covalently crosslinked network. It was discovered that these crosslinked materials can display enhanced moisture resistance, as manifested by improved optical clarity when the polyurethane films are exposed to humid or wet environments shortly after curing.

Solvent

In exemplary embodiments, the aforementioned polymer is dispersed in water to obtain an aqueous composition having a suitable viscosity that enables proper spraying and film formation on the substrate.

In one process, the polymer or prepolymer, either neat or in solution, is added incrementally to most or a substantial portion of the aqueous dispersing medium with agitation. Alternatively, the aqueous dispersing medium can be added incrementally to the prepolymer with stirring. This latter method is less preferred because commonly upon initial addition of the dispersing medium, a high viscosity, grease-like material results, which can be difficult to mix with chain extenders. In the absence of efficient stirring, the possibility increases of forming an unstable emulsion system because of large particle size agglomerates. By adding the prepolymer to water, this high initial viscosity is avoided.

As described in U.S. Pat. No. 4,147,679 (Scriven et al.) and U.S. Pat. No. 4,066,591 (Scriven et al.), additional solvent can be added to the isocyanate-containing prepolymer or even to the polymer before or after addition of the prepolymer, where the solvent is added to the aqueous medium. In referring to the aqueous dispersing medium, it is intended to include water plus water having solvent and possibly neutralizing agents. If the water is added to the prepolymer, any method known to those skilled in the art in producing polyurethane aqueous dispersions can be used to reduce the possibility of increasing the formation of large particle size agglomerates.

Optional Additives

Various polyurethane dispersion additives are known in the art. In some embodiments, one or more of these additives are added to the disclosed polyurethane aerosol compositions.

The polyurethane aerosol composition optionally includes at least one rheology modifier, such as a thickener. Thickeners are additives that increase the viscosity of a liquid, solution or mixture without substantially modifying its other properties. To provide a uniform spray coating, a suitable thickener should rapidly drive up the viscosity of the coating composition as the propellant is volatilized, and allow the coating to adhere to vertical surfaces without running. Advantageous thickeners include those based on urethane block copolymers. Especially preferred thickeners include those based on hydrophobically-modified ethylene oxide-based urethane block copolymers, such as those available from Dow Chemical Company (Midland, Mich.) under the tradename ACRYSOL.

Preferably, the amount of rheology modifier present is sufficient to enable the polyurethane dispersion to have acceptable vertical cling when sprayed onto a substrate. In some embodiments, the rheology modifier is present in an amount of at least 0.1 weight percent, at least 0.375 weight percent, 0.5 weight percent, at least 0.75 weight percent, at least 1 weight percent, at least 1.1 weight percent, or at least 1.2 weight percent, based on the overall weight of the composition. In some embodiments, the rheology modifier is present in an amount up to 5 weight percent, up to 4.5 weight percent, up to 4 weight percent, up to 3.5 weight percent, up to 3 weight percent, or up to 2.25 weight percent based on the overall weight of the composition. In a preferred method, the rheology modifier is added to water prior to dispersing the isocyanate-terminated polyurethane prepolymer synthesized above.

Optionally, the polyurethane aerosol composition includes at least one defoaming agent. A defoaming agent is a chemical additive that hinders the formation of foam, either before or after the dispersion is sprayed onto a substrate. These additives are especially beneficial in aerosol-based coatings, since the presence of foam can produce surface defects and/or impair spray performance. Particularly useful defoaming agents include modified polyols, such as those available from Elementis Specialties, Inc. (East Windsor, N.J.), under the tradename DAPRO.

The amount of defoaming agent should ideally be sufficient to eliminate or minimize foam-related defects in the coated polyurethane films. In some embodiments, the defoaming agent is present in an amount of at least 0.01 weight percent, at least 0.05 weight percent, at least 0.075 weight percent, at least 0.1 weight percent, at least 0.12 weight percent, or at least 0.15 weight percent, based on the overall weight of the composition. In some embodiments, the defoaming agent is present in an amount of up to 1.2 weight percent, up to 1 weight percent, up to 0.8 weight percent, up to 0.75 weight percent, up to 0.65 weight percent, or up to 0.6 weight percent, based on the overall weight of the composition.

Many other additives may be included. These additives include, but are not limited to, for example, crosslinking agents, plasticizers, thixotropic agents, biocides, adhesion promoters (such as silane adhesion promoters), corrosion inhibitors, coalescing agents, anti-crater agents, slip aids, fillers, flow aids, pigments, colorants, photostabilizers (such as hindered amine light stabilizers and UV adsorbers), antioxidants, and anti-fouling agents. For example, the polyurethane aerosol composition may include an agent such as a pigment or colorant to provide tinting when applied on glass surfaces. In one exemplary embodiment, the polyurethane aerosol composition includes a tinting agent that is photoactive, such as described in International Patent Application No. WO 2013/003404 (Endle et al.).

Propellants

The propellant of the aerosol composition is used to dispense the polymer, water, and any additives, from the container. Commonly, the propellant is a liquefied gas, a compressed gas, or both.

Polyurethane aerosol compositions may include any of a number of liquefied gases known to one of skill in the art as a propellant. Such liquefied gases include, for example, dimethyl ether, C1-C4 alkanes (such as propane, butane, isobutane, cyclobutane, and mixtures thereof), refrigerants, hydrochlorofluorocarbons, hydrofluorocarbons, and mixtures thereof. Compressed gases include, for example, carbon dioxide, nitrogen, nitrous oxide, compressed air, and mixtures thereof. While there are no particular restrictions on the selection of the propellant, preferred aqueous polyurethane aerosol compositions include dimethyl ether, which was found to yield films having a surprisingly high optical clarity.

In some embodiments, the propellant is present in an amount of at least 10 weight percent, at least 11 weight percent, at least 12 weight percent, at least 13 weight percent, at least 14 weight percent, at least 15 weight percent, at least 16 weight percent, at least 17 weight percent, at least 18 weight percent, at least 19 weight percent, or at least 20 weight percent, based on the overall weight of the composition. In some embodiments, the propellant is present in an amount of at most 40, at most 35, at most 34, at most 33, at most 32, at most 31, at most 30, at most 29, at most 28, at most 27, at most 26, at most 25, at most 24, at most 23, at most 22, at most 21, or at most 20 weight percent, based on the overall weight of the composition.

Devices and Applications

The provided polyurethane aerosol composition and propellant can be charged in a hermetically sealed container as part of an aerosol device known to one skilled in the art. Such an aerosol device commonly includes the hermetically sealed container along with a suitable valve and actuator that enables a user to dispense the contents of the container in a controlled manner. Exemplary actuators can be provided by, for example, Aptar Group Inc (Chicago, Ill.), Lindal Valve Co. (Bedfordshire, England), Newman-Green Inc. (Addison, Ill.), Precision Valve Co. (Yonkers, N.Y.), and Summit Packaging Systems, Inc. (Manchester, N.H.).

To use the aerosol device, a user can direct the orifice of the actuator toward the substrate to be coated and depress the actuator to release some of the pressurized contents of the container, thereby spraying the polyurethane composition onto the substrate. The spray may be in a mist-like pattern, glob-type pattern, or a stream-type pattern. A mist-like pattern is characterized by fine droplets that coalesce to form a smooth, continuous and optionally transparent film. A glob-type pattern is characterized by large droplets that may or may not coalesce to form a smooth film. A stream-type pattern is characterized by a narrow continuous stream that does not coalesce to form a continuous film. Generally to form a smooth, continuous film a mist-like pattern is preferred. Glob-type and stream-type patterns may be desirable for other applications. The makeup of the composition coating the substrate reflects the polyurethane aerosol composition as described above minus most if not all of the propellant, which generally volatilizes before reaching the substrate.

One aspect of the current invention involves an aerosol polyurethane composition that is shelf stable for at least one year and optionally is crosslinkable at room temperature. Once sealed in a container, these compositions were observed to spray and cure or harden as designed on the substrate over a period exceeding a year from the time the composition was first contained. By contrast, traditional crosslinkable systems, such as those based on aziridines, were found to polymerize prematurely (in the aerosol container) within a much shorter period, typically on the order of a few days. Such compositions are described, for example, in Coogan, Richard G. (1997). Post-crosslinking of water-borne urethanes. Progress in Organic Coatings, 32, 51-63.

The polyurethane of the aerosol composition can have a weight average molecular weight ($M_w$) of at least 10,000; at least 14,000; at least 20,000; at least 30,000; at least 40,000; at least 45,000; or at least 50,000 g/mol. In exemplary embodiments, the polyurethane has a weight average molecular weight of at most 200,000, at most 175,000; at most 150,000; at most 125,000; at most 100,000, or at most 75,000 g/mol.

As alluded to previously, the polyurethane polymer includes reactive silanol (Si—OH) groups that can react with each other to form siloxane linkages, —Si—O—Si— under suitable conditions. Assuming that the silyl terminal groups are multifunctional, this can produce a highly crosslinked polyurethane network. This reaction can be facilitated by removing the water after coating the substrate to drive condensation of the silanol groups and crosslink the system.

Advantageously, the coated polyurethanes were observed to resist thermal and ultraviolet degradation. This can be measured by changes in gloss and/or color of the film. Preferably, these coatings exhibit a color change $\Delta E$ value of less than 1 (after 3200 hours of the Weatherability Test as described in the Examples), and more preferably less than 0.5. In some embodiments, the discoloration $\Delta E$ is less than 0.25. Preferably, these coatings exhibit a % gloss loss (after 3200 hours of the Weatherability Test as described in the Examples) of less than 12%, and more preferably less than 8%. In some embodiments, the % gloss loss is less than 4% or less than 2%.

In other embodiments, the polyurethane polymers described herein have a water resistance (as determined by the test method in the Examples), as evidenced by $\Delta E$ values of less than 20 and more preferably less than 10. In some embodiments, the water resistance $\Delta E$ is less than 8, less than 5, less than 3, or less than 2.

The dispersions of the invention can be spray coated on a variety of substrates to form high gloss, water and solvent resistant, tough, scratch resistant, preferably thermal and light stable, non-yellowing films. Substrates such as leather, woven and nonwoven webs, vinyl, glass, glass fibers, wood, metals, treated metal such as primed and painted metals (such as automobile and marine vehicle surfaces), polymeric materials and surfaces, can be coated with the polyurethane coatings disclosed herein.

In some embodiments, the provided polyurethane coatings are useful as outermost or intermediate coatings. Advantageously, these coatings can be optically transparent to avoid altering the aesthetic appearance of an underlying layer or substrate. For example, these coatings may be applied over primer and sealer layers on metal (including primed metal and painted metal), plastic, and fiber-reinforced plastic composite substrates used in the fabrication of vehicular body parts and appliance cabinets. Vehicular body parts include, for example, hoods, fenders, bumpers, grills, rocker panels and the like; and appliance cabinets include, for example, washers, clothes dryers, refrigerators, and the like. Vehicles that can benefit from these coatings include automobiles, trucks, bicycles, airplanes, and watercraft.

The coatings can be used as intermediate coatings applied under top/finish coatings which typically include paints, enamels, and lacquers, which themselves can be chemically crosslinked to provide durable, scratch-resistant surface finishes. The composition of the invention can also adhere to body filler compositions used in automotive body repair.

The provided aerosol compositions can also be sprayed onto composite materials, such as fiber reinforced plastics wherein the plastics are toughened by the addition of glass, boron, graphite, ceramic, or dissimilar polymer fibers; and filled plastics wherein the plastic properties are modified by the addition of inorganic powders, (such as calcium carbonate, talc, titanium dioxide, carbon black, etc.), flakes (for example, aluminum or mica), and microspheres/beads (for example, glass or polymeric). The compositions of the invention may also be coated on surfaces such as concrete, asphalt, etc. (including, for example, roadways, patios, and sidewalks), or adhesive-backed pavement marking tape.

The provided compositions and methods can be further exemplified through the following non-exhaustive list of embodiments, A-BL:

A. A polyurethane aerosol composition including: a polymer obtained by reacting (i) a polyol or thiol having isocyanate-reactive functional groups; (ii) a neutralized water-solubilizing compound; (iii) a diisocyanate; and (iv) an isocyanate-reactive chain extender including hydrazine or a hydrazide; water; and a propellant.

B. The composition of embodiment A, where the polymer has a weight average molecular weight ranging from 10,000 g/mol to 200,000 g/mol.

C. The composition of embodiment B, where the polymer has a weight average molecular weight ranging from 14,000 g/mol to 75,000 g/mol.

D. A polyurethane aerosol composition including: a urethane moiety obtained by reacting (i) a polyol or thiol having isocyanate-reactive functional groups; (ii) a neutralized water-solubilizing compound; and (iii) a diisocyanate; a silyl terminal group; water; and a propellant.

E. The composition of embodiment D, where the silyl terminal group includes an alkoxy silane having the formula $(R^2O)_3SiR^3$—Z, where $R^2$ is hydrogen or a $C_1$-$C_4$ alkyl, $R^3$ is divalent alkylene, alkylarylene, oxyalkylene; and Z is selected from —OH, —SH, —NHR$^4$, and —NH$_2$, where $R^4$ is an aromatic or aliphatic cyclic group.

F. The composition of any one of embodiments A-E and BE-BG, where the neutralized water-solubilizing compound includes a reaction product of the formula (HB)$_2$R$^1$A, where B is O, S, NH or NR, where R is an alkyl group including 1 to 4 carbon atoms; $R^1$ is a trivalent organic linking group; and A is an anionic group selected from —SO$_3$M, —OSO$_3$M, —CO$_2$M, and —OPO(OM)$_2$ and where M is a water-soluble cation.

G. The composition of any one of embodiments A-F and BE-BG, where the water is present in an amount ranging from 50 weight percent to 90 weight percent based on the overall weight of the composition excluding the propellant.

H. The composition of embodiment G, where the water is present in an amount ranging from 70 weight percent to 85 weight percent based on the overall weight of the composition excluding the propellant.

I. The composition of embodiment H, where the water is present in an amount ranging from 73 weight percent to 82 weight percent based on the overall weight of the composition excluding the propellant.

J. The composition of any one of embodiments A-I and BE-BG, where the propellant is present in an amount ranging from 10 to 40 weight percent based on the overall weight of the composition.

K. The composition of embodiment J, where the propellant is present in an amount ranging from 12 to 35 weight percent based on the overall weight of the composition.

L. The composition of embodiment K, where the propellant is present in an amount ranging from 20 to 30 weight percent based on the overall weight of the composition.

M. The composition of any one of embodiments A-L, where the propellant includes dimethyl ether.

N. The composition of any one of embodiments A-M, where the polyurethane component of the composition has at most 1 weight percent ethylene oxide.

O. The composition of embodiment D or E, further including a urea moiety obtained by reacting an isocyanate-terminated prepolymer and an isocyanate-reactive chain extender.

P. The composition of embodiment O or BE, where the isocyanate-reactive chain extender is hydrazine or a hydrazide.

Q. The composition of embodiment P, where the hydrazide is selected from carbodihydrazide, oxalic dihydrazide, thiocarbohydrazide, or a dihydrazide having the following formula:

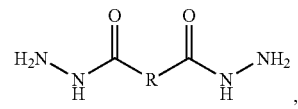

where R is a covalent bond, a heteroatom, or a divalent organic radical.

R. The composition of any one of embodiments A-Q and BE-BG, further including a rheology modifier.

S. The composition of embodiment R, where the rheology modifier is a thickener that includes a urethane block copolymer.

T. The composition of embodiment S, where the urethane block copolymer is a hydrophobically modified ethylene oxide-based urethane block copolymer.

U. The composition of any one of embodiments R-T, where the rheology modifier is present in an amount ranging from 0.1 to 5 weight percent based on the overall weight of the composition.

V. The composition of embodiment U, where the rheology modifier is present in an amount ranging from 0.375 to 3 weight percent based on the overall weight of the composition.

W. The composition of embodiment V, where the rheology modifier is present in an amount ranging from 0.75 to 2.25 weight percent based on the overall weight of the composition.

X. The composition of any one of embodiments A-W and BE-BG, further including a defoaming agent.

Y. The composition of embodiment X, where the defoaming agent includes a modified polyol.

Z. The composition of embodiment X or Y, where the defoaming agent is present in an amount ranging from 0.01 to 1.2 weight percent based on the overall weight of the composition.

AA. The composition of embodiment Z, where the defoaming agent is present in an amount ranging from 0.075 to 0.75 weight percent based on the overall weight of the composition.

AB. The composition of embodiment AA, where the defoaming agent is present in an amount ranging from 0.15 to 0.6 weight percent based on the overall weight of the composition.

AC. The composition of any one of embodiments A-AB and BE-BG, further including a pigment.

AD. An aerosol device including: a hermetically sealed container with the polyurethane aerosol composition of any one of embodiments A-AC and BE-BG enclosed therein via a valve; and an actuator for dispensing the polyurethane aerosol composition from the container.

AE. A method of making a polyurethane aerosol composition including: obtaining an isocyanate-terminated polyurethane prepolymer by reacting a mixture including a polyol or thiol including two isocyanate-reactive groups and a diisocyanate; providing a solubilized polyurethane prepolymer by reacting sequentially the isocyanate-terminated polyurethane prepolymer with: (i) an acidic water-solubilizing compound; (ii) a base to neutralize the water-solubilizing compound; and (iii) a silyl terminal group; dispersing the solubilized polyurethane prepolymer in water; reacting the solubilized polyurethane prepolymer with an isocyanate-reactive chain extender to form a polymer; and adding a propellant to obtain the polyurethane aerosol composition.

AF. The method of embodiment AE, where the silyl terminal group includes an alkoxy silane having the formula $(R^2O)_3SiR^3-Z$, where $R^2$ is hydrogen or a C1-C4 alkyl, $R^3$ is divalent alkylene, alkylarylene, or oxyalkylene; and Z is selected from —OH, —SH, —NHR$^4$, and —NH$_2$, where $R^4$ is an aromatic or aliphatic cyclic group.

AG. A method of making a polyurethane aerosol composition including: obtaining an isocyanate-terminated polyurethane prepolymer by reacting a mixture including a polyol or thiol including two isocyanate-reactive groups and a diisocyanate; providing a solubilized polyurethane prepolymer by reacting sequentially the isocyanate-terminated polyurethane prepolymer with: (i) an acidic water-solubilizing compound; and (ii) a base to neutralize the water-solubilizing compound; dispersing the solubilized polyurethane prepolymer in water; reacting the solubilized polyurethane prepolymer with an isocyanate-reactive chain extender including hydrazine or a hydrazide to obtain a polymer; and adding a propellant to obtain the polyurethane aerosol composition.

AH. The composition of embodiment AG, where the polymer has a weight average molecular weight ranging from 10,000 g/mol to 200,000 g/mol.

AI. The composition of embodiment AH, where the polymer has a weight average molecular weight ranging from 14,000 g/mol to 75,000 g/mol.

AJ. The method of any one of embodiments AE-AI, where the base includes an alkyl amine.

AK. The method of any one of embodiments AE-AJ, where the isocyanate-reactive chain extender includes hydrazine or a hydrazide.

AL. The method of embodiment AK, where the hydrazide is selected from a carbohydrazide, oxalic dihydrazide, thiocarbohydrazide, or a dihydrazide having the following formula:

$$H_2N-\underset{H}{N}-\overset{O}{\underset{}{C}}-R-\overset{O}{\underset{}{C}}-\underset{H}{N}-NH_2$$

where R is a covalent bond, a heteroatom, or a divalent organic radical.

AM. The method of any one of embodiments AE-AL, where the water-solubilizing compound is represented by the formula $(HB)_2R^1A$, where B is O, S, NH or NR, where R is an alkyl group including 1 to 4 carbon atoms; $R^1$ is a trivalent organic linking group; and A is an anionic group selected from —SO$_3$M, —OSO$_3$M, —CO$_2$M, and —OPO(OM)$_2$ and where M is a water-soluble cation.

AN. The method of embodiment AM, where the water-soluble cation is H.

AO. The method of any one of embodiments AE-AN, where the water is present in an amount ranging from 50 weight percent to 95 weight percent based on the overall weight of the composition excluding the propellant.

AP. The method of embodiment AO, where the water is present in an amount ranging from 70 weight percent to 90 weight percent based on the overall weight of the composition excluding the propellant.

AQ. The method of embodiment AP, where the water is present in an amount ranging from 73 weight percent to 85 weight percent based on the overall weight of the composition excluding the propellant.

AR. The method of any one of embodiments AE-AQ, where the propellant includes dimethyl ether.

AS. The method of any one of embodiments AE-AR, further including combining a rheology modifier and the polymer.

AT. The method of embodiment AS, where the rheology modifier is a thickener that includes a hydrophobically-modified ethylene oxide-based urethane block copolymer.

AU. The method of any one of embodiments AE-AT, further including adding a defoaming agent to the polyurethane dispersion, the defoaming agent including a modified polyol.

AV. The method of any one of embodiments AE-AU, where the solubilized polyurethane polymer and any additives are placed in a container, and further including: hermetically sealing the container with a valve; and introducing the propellant into the sealed container.

AW. A method of providing a crosslinked polyurethane coating on a substrate from a one-part composition, the method including: depositing an aqueous polyurethane dispersion onto the substrate through an aerosol actuator using a propellant, the aqueous polyurethane dispersion including: urethane moieties obtained by reacting (i) a polyol or thiol having isocyanate-reactive functional groups; (ii) a neutralized water-solubilizing compound; and (iii) a diisocyanate; silyl terminal groups; and water;

and removing the water to condense the silyl terminal groups, thereby providing a crosslinked polyurethane coating.

AX. The method of embodiment AW, where the silyl terminal groups include an alkoxy silane having the formula $(R^2O)_3SiR^3—Z$, where $R^2$ is hydrogen or a C1-C4 alkyl, $R^3$ is divalent alkylene, alkylarylene, or oxyalkylene; and Z is selected from —OH, —SH, —NHR$^4$, and —NH$_2$, where $R^4$ is an aromatic or aliphatic cyclic group.

AY. A method of providing a thermoplastic polyurethane coating on a substrate from a one-part composition, the method including: depositing an aqueous polyurethane dispersion onto the substrate through an aerosol actuator using a propellant, the aqueous polyurethane dispersion including a polymer obtained by reacting: (i) a polyol or thiol having isocyanate-reactive functional groups; (ii) a neutralized water-solubilizing compound; (iii) a diisocyanate; and (iv) an isocyanate-reactive chain extender including hydrazine or a hydrazide; and removing the water to harden the thermoplastic polyurethane coating.

AZ. The method of any one of embodiments AW-AY, where the propellant includes dimethyl ether.

BA. The method of any one of embodiments AW-AZ, where the polyurethane coating is transparent.

BB. The method of any one of embodiments AW-BA, where the polyurethane coating displays a gloss loss value of at most 12% at 3200 hours when subjected to the Weatherability Test.

BC. The method of embodiment BB, where the polyurethane coating displays a gloss loss value of at most 8% at 3200 hours when subjected to the Weatherability Test.

BD. The method of embodiment BC, where the polyurethane coating displays a gloss loss value of at most 4% at 3200 hours when subjected to the Weatherability Test.

BE. A polyurethane aerosol composition including: a polymer obtained by reacting (i) a polyol or thiol having isocyanate-reactive functional groups; (ii) a neutralized water-solubilizing compound; (iii) a diisocyanate; and (iv) an isocyanate-reactive chain extender; water; and a dimethyl ether propellant, where the polymer has a weight average molecular weight ranging from 10,000 g/mol to 200,000 g/mol.

BF. The composition of embodiment BE, where the polymer has a weight average molecular weight ranging from 14,000 g/mol to 125,000 g/mol.

BG. The composition of embodiment BF, where the polymer has a weight average molecular weight ranging from 25,000 g/mol to 75,000 g/mol.

BH. A method of providing a thermoplastic polyurethane coating on a substrate from a one-part composition, the method including: depositing an aqueous polyurethane dispersion onto the substrate through an aerosol actuator using a dimethyl ether propellant, the aqueous polyurethane dispersion including a polymer obtained by reacting: (i) a polyol or thiol having isocyanate-reactive functional groups; (ii) a neutralized water-solubilizing compound; (iii) a diisocyanate; and (iv) an isocyanate-reactive chain extender; and removing the water to harden the thermoplastic polyurethane coating, where the polymer has a weight average molecular weight ranging from 10,000 g/mol to 200,000 g/mol.

BI. The method of embodiment BH, where the polymer has a weight average molecular weight ranging from 14,000 g/mol to 125,000 g/mol.

BJ. The method of embodiment BI, where the polymer has a weight average molecular weight ranging from 25,000 g/mol to 75,000 g/mol.

BK. A method of making a polyurethane aerosol composition including: obtaining an isocyanate-terminated polyurethane prepolymer by reacting a mixture including a polyol or thiol including two isocyanate-reactive groups and a diisocyanate; providing a solubilized polyurethane prepolymer by reacting sequentially the isocyanate-terminated polyurethane prepolymer with: (i) an acidic water-solubilizing compound; and (ii) a base to neutralize the water-solubilizing compound; dispersing the solubilized polyurethane prepolymer in water; reacting the solubilized polyurethane prepolymer with an isocyanate-reactive chain extender to obtain a polymer; and adding a dimethyl ether propellant to obtain the polyurethane aerosol composition, where the polymer has a weight average molecular weight ranging from 10,000 g/mol to 200,000 g/mol.

BL. The method of embodiment BK, where the polymer has a weight average molecular weight ranging from 25,000 g/mol to 75,000 g/mol.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used to describe the examples:

° C.: degrees Centigrade
g/m$^2$: grams per square meter
kPa: kiloPascal
mil: 10$^{-3}$ inches
mL: milliliter
M$_w$: weight average molecular weight
μm: micrometers
nm: nanometers
psi: pounds per square inch
UV: ultraviolet
wt. %: weight percent
W·m$^{-2}$nm$^{-1}$ Watts per square meter per nanometer
AMEO: 3-Aminopropyltriethoxysilane, obtained under the trade designation, "DYNASYLAN AMEO" from Evonik Industries AG, Essen, Germany.
CDH: 1,3-diaminourea, obtained under the synonym "CARBOHYDRAZIDE, 98%" from Sigma-Aldrich Company.
CHDM: Cyclohex-1,4-ylenedimethanol, obtained from Eastman Chemical Company, Kingsport, Tenn.
DBTDA: Dibutyltin diacetate, obtained from Sigma-Aldrich Company.
DF-1760: A defoamer, obtained under the trade designation "DAPRO DF-1760" from Elementis Specialties, Inc., Hightstown, N.J.
DMDW: bis(4-isocyanatocyclohexyl) methane, obtained under the trade designation "DESMODUR W" from Bayer Material Science AG, Leverkusen, Germany.
DME: Dimethyl ether, obtained from Aeropres Corporation, Shreveport, La.
DMPA: [(2,6-Dimethylphenyl)amino](oxo)acetic acid, obtained from Tokyo Chemical Industry Co. Ltd., Tokyo, Japan.
EDA: Ethylene diamine, obtained from Alfa-Aesar, Ward Hill, Mass.

I-1010: Pentaerythritol tetrakis(3-(3,5-di-tert-butyl-4-hydroxyphenyl)propionate), obtained under the trade designation "IRGANOX 1010" from BASF SE, Ludwigshafen am Rhein, Germany.

KCG: A biocide, obtained under the trade designation "KATHON CG/ICP" from Dow Chemical Company, Midland, Mich.

MEK: Methyl ethyl ketone.

PBZ: A biocide, obtained under the trade designation "PROXEL BZ PLUS" from Lonza Group Ltd., Basel, Switzerland.

PPG-2000: A polyether polyol, obtained under the trade designation "ARCOL PPG-2000" from Bayer Material Science AG.

RM-12W: A non-ionic rheology modifier, obtained under the trade designation "ACRYSOL RM-12W" from Dow Chemical Company.

RU-13-825: A polyurethane dispersion, obtained under the trade designation "RU 13-825" from Stahl Holdings, b.v., Waalwijk, Netherlands.

T-292: A hindered amine light stabilizer, obtained under the trade designation "TINUVIN 292" from BASF, Charlotte, N.C.

T-405: A UV absorber, obtained under the trade designation "TINUVIN 405" from BASF, Charlotte, N.C.

TEA: Triethylamine.

TG-403: A clear surface control additive, obtained under the trade designation "TEGO GLIDE 403" from Evonik Industries.

V-220: A polyether polyol, obtained under the trade designation "VORANOL 220-056N" from Dow Chemical Company.

XR-5508: A carbodiimide crosslinker, obtained under the trade designation "XR 5508" from Stahl Holdings, b.v.

Polyurethane Dispersions

PD-1

An aqueous polyurethane dispersion was prepared as follows. 101.74 grams V-220 and 51.84 grams DMDW were added to a 500 mL three-necked round bottom flask equipped with a mechanical stirrer, condenser and argon inlet. Approximately 0.04 grams DBTDA was added to the flask and the mixture heated, with stirring, under argon, to 78° C. and held for one hour. 6.40 grams DMPA and 41.70 grams MEK were added and the mixture held at 85° C. until the DMPA dissolved, approximately 3 hours. 7.67 grams CHDM was added to the flask and stirring continued for another 2 hours, after which the solution was cooled to about 25° C., then diluted with 91.5 grams acetone. While maintaining stirring, 4.84 grams TEA, 1.67 grams I-1010, 1.67 grams T-292 and 3.34 grams T-405 were added and the solution held for 30 minutes, resulting in an isocyante-terminated prepolymer. 340 grams distilled water was added to a 1000 mL three-necked round bottom flask equipped with a mechanical stirrer, thermometer, and argon inlet. While stirring the water at 650 rpm, the prepolymer solution was transferred to the flask in approximately 30 minutes, at 21° C., by means of an addition funnel. The stirrer speed was increased to 400 rpm and 2.44 grams CDH added. A premixture of 0.55 grams EDA in 1.28 grams distilled water was added dropwise to the flask over approximately 5 minutes, after which the dispersion was heated to 50° C. and held for one hour. 0.16 grams DF-1760 was added and the MEK and acetone subsequently removed by means of a rotary evaporator at 40° C. and 5.33 kPa vacuum. The resulting aqueous dispersion was approximately 35% by weight polyurethane.

PD-2

An aqueous silane-terminated polyurethane dispersion was prepared as follows. 368.10 grams PPG-2000 and 188.61 grams DMDW were added to a 2-liter, three-necked, round bottom flask equipped with a mechanical stirrer, condenser and argon inlet. Approximately 0.15 grams DBTDA was added to the flask and the mixture heated, with stirring, under argon, to 78° C. and held for 30 minutes. 23.18 grams DMPA and 151.35 grams MEK were added and the mixture held at 85° C. until the DMPA dissolved, approximately 2.5 hours. 25.77 grams CHDM was added to the flask and stirring continued for another 1.5 hours, after which the solution was cooled to about 25° C., then diluted with 339 grams acetone. While maintaining stirring, 17.52 grams TEA, 3.02 grams I-1010 and 6.05 grams T-292 were added and the solution held for 30 minutes. 6.09 grams AMEO was added and stirring continued for another 30 minutes, resulting in an isocyanate terminated prepolymer. 1,200 grams distilled water was added to a 3-liter, three-necked, round bottom flask equipped with a mechanical stirrer, thermometer, and argon inlet. While stirring the water at 300 rpm, the prepolymer solution was transferred to the flask in approximately 30 minutes, at 21° C., by means of an addition funnel. A premixture of 8.94 grams of CDH in 50.1 grams distilled water was added dropwise to the flask over approximately 5 minutes, after which a second premixture of 2.01 grams EDA in 11.25 grams distilled water was also added dropwise to the flask over approximately 5 minutes. The dispersion was then heated to 50° C. and held for one hour. 0.60 grams DF-1760 was added and the MEK and acetone subsequently removed by means of a rotary evaporator at 40° C. and 5.33 kPa vacuum. The resulting aqueous dispersion was approximately 35% by weight silane-terminated polyurethane.

PD-3

An aqueous silane-terminated polyether-based polyurethane dispersion was prepared as follows. 63.62 grams V-220 and 32.35 grams DMDW were added to a 500 mL four-necked round bottom flask equipped with a mechanical stirrer, thermometer, condenser and nitrogen inlet. Approximately 0.02 grams DBTDA was added to the flask and the mixture heated, with stirring, under nitrogen, to 78° C. and held for one hour. 4.0 grams DMPA and 20.0 grams MEK were added and the mixture held at 85° C. until the DMPA dissolved, approximately 3 hours. The isocyanate content of the prepolymers was determined by standard dibutylamine back titration method. Upon obtaining the theoretical isocyanate value, 4.78 grams CHDM was added to the flask and stirring continued for another 2 hours, after which the solution was cooled to about 40° C., then diluted with 60 grams acetone. While maintaining stirring, 3.02 grams TEA was added and the solution held for 30 minutes. 5.53 grams AMEO was then added and stirring continued for another 20 mintues, followed by a premixture of 1.53 grams CDH in 8.0 grams distilled water. After 10 minutes, 190 grams distilled water at approximately 5-10° C. was slowly added under vigorous stirring, resulting in an aqueous dispersion. A premixture of 0.34 grams of EDA in 5.0 grams of distilled water was slowly added and stirring continued for one hour at 21° C. The MEK and acetone subsequently removed by means of a rotary evaporator at 40° C. and 5.33 kPa vacuum. The resulting aqueous silane-terminated polyether-based polyurethane dispersion was approximately 35% by weight polyether-based polyurethane.

PD-4

An aqueous silane-terminated polyether-based polyurethane dispersion was prepared as follows. 60.51 grams V-220 and 35.48 grams DMDW were added to a 500 mL four-necked round bottom flask equipped with a mechanical stirrer, thermometer, condenser and nitrogen inlet. Approximately 0.02 grams DBTDA was added to the flask and the mixture heated, with stirring, under nitrogen, to 78° C. and held for one hour. 4.0 grams DMPA and 20.0 grams MEK were added and the mixture held at 85° C. until the DMPA dissolved, approximately 3 hours. The isocyanate content of the prepolymers was determined by standard dibutylamine back titration method. Upon obtaining the theoretical NCO value, 5.23 grams CHDM was added to the flask and stirring continued for another 2 hours, after which the solution was cooled to about 40° C., then diluted with 60 grams acetone. While maintaining stirring, 3.02 grams TEA was added, the solution held for 30 minutes, then partially terminated with 3.35 grams AMEO and stirring continued for another 20 minutes. 1.0 gram I-1010 and 2.0 grams T-292 were added, followed by a premixture of 0.78 grams CDH in 10.0 grams distilled water. After 5 minutes, 200 grams distilled water at approximately 5-10° C. was slowly added under vigorous stirring, resulting in an aqueous dispersion. A premixture of 0.79 grams of EDA in 6.0 grams of distilled water was slowly added and stirring continued for one hour at 21° C. The MEK and acetone subsequently removed by means of a rotary evaporator at 40° C. and 5.33 kPa vacuum. The resulting aqueous silane-terminated polyether-based polyurethane dispersion was approximately 35% by weight polyether-based polyurethane.

PD-5

An aqueous polyether-based polyurethane dispersion was prepared according to the method generally described in PD-3, wherein the AMEO was omitted from the synthesis.

Example 1

165.63 grams deionized water, 1.58 grams DF-1760, 14.01 grams RM-12W and 218.0 grams PD-1 were added in sequence to a 500 mL plastic beaker and dispersed at medium shear for 5 minutes at 21° C. using a vortex mixer, model "MV1 MINI VORTEXER" obtained from IKA Works, Inc., Wilmington, N.C. 240 grams of this mixture was transferred to an aerosol can, followed by a glass mixing marble, and the can crimped closed with a female valve. 80 grams DME was then added to the aerosol can by means of a model "3SB" burette pressure filler, obtained from Aero-Tech Laboratory Equipment Company, LLC, Lebanon, Mo., and a male actuator fitted to the female valve.

Example 2

864.3 grams deionized water, 2.02 grams DF-1760, 40.05 grams RM-12W and 1,094.1 grams PD-2 were added in sequence to a one gallon (3.785 liter) plastic beaker and dispersed at medium shear for 5 minutes at 21° C. using the vortex mixer. 383 grams of this mixture was transferred to an aerosol can, followed by a glass mixing marble, and the can crimped closed with a female valve. 128 grams DME was then added to the aerosol can by means of the burette pressure filler and a male actuator then fitted to the female valve.

Example 3

86.43 grams deionized water, 0.22 grams DF-1760, 4.03 grams RM-12W and 109.46 grams PD-3 were added in sequence to a 500 mL plastic beaker and dispersed at medium shear for 5 minutes at 21° C. using the vortex mixer. 120 grams of this mixture was transferred to an aerosol can, followed by a glass mixing marble, and the can crimped closed with a female valve. 40 grams DME was then added to the aerosol can by means of the burette pressure filler and a male actuator then fitted to the female valve.

Example 4

57.66 grams deionized water, 0.55 grams DF-1760, 5.00 grams RM-12W and 76.74 grams PD-4 were added in sequence to a 250 mL plastic beaker and dispersed at medium shear for 5 minutes at 21° C. using the vortex mixer. 120 grams of this mixture was transferred to an aerosol can, followed by a glass mixing marble, and the can crimped closed with a female valve. 40 grams DME was then added to the aerosol can by means of the burette pressure filler and a male actuator then fitted to the female valve.

Comparative A 286.97 grams deionized water, 3.61 grams DF-1760, 0.62 grams KCG, 21.33 grams RM-12W and 287.60 grams RU-13-825 were added in sequence to a one liter plastic beaker and dispersed at medium shear for 5 minutes at 21° C. using the vortex mixer. 383 grams of this mixture was transferred to an aerosol can, followed by a glass mixing marble, and the can crimped closed with a female valve. 128 grams DME was then added to the aerosol can by means of the burette pressure filler and a male actuator then fitted to the female valve.

Comparative B 86.43 grams deionized water, 0.22 grams DF-1760, 4.03 grams RM-12W and 109.44 grams PD-5 were added in sequence to a 500 mL plastic beaker and dispersed at medium shear for 5 minutes at 21° C. using the vortex mixer. 120 grams of this mixture was transferred to an aerosol can, followed by a glass mixing marble, and the can crimped closed with a female valve. 40 grams DME was then added to the aerosol can by means of the burette pressure filler and a male actuator then fitted to the female valve.

Comparative C 46.38 grams deionized water, 1.84 grams DF-1760, 10.70 grams RM-12W, 211.16 grams RU-13-825 and 30.06 grams XR-5508 were added in sequence to a 500 mL plastic beaker and dispersed at medium shear for 5 minutes at 21° C. using the vortex mixer. 120 grams of this mixture was transferred to an aerosol can, followed by a glass mixing marble, and the can crimped closed with a female valve. 40 grams DME was then added to the aerosol can by means of the burette pressure filler and a male actuator then fitted to the female valve.

Test Methods

Test Panel Preparation

Test panels were prepared by spraying the aerosol composition onto both black and white automotive painted panels and dried at 21° C. for 24 hours. The dried film thickness was approximately 2 mils (50.8 μm).

Gloss

Gloss of test panels was measured at 60 degrees using a model "4601 HAZE-GLOSS REFLECTOMETER" obtained from Byk-Gardener GmbH, Geretsried, Germany.

Weight Average Molecular Weight

Measured by size-exclusion chromatography (SEC) using a model "e2695" pump/autosampler from Waters Corporation, Milford, Mass., with PL-Gel-2 columns, calibrated against narrow molecular weight polystyrene standards.

Weatherability Test

Prepared test panels were weathered per ISO 4892-2 (2013), the contents of which are incorporated herein in their entirety. ISO 4892-2 (2013), Method A, Cycle No. 4, was followed with a deviation of Narrow Band Irradiance (340 nm) at a spectral irradiance of 0.55 W·m$^{-2}$ nm$^{-1}$. Additionally, during the dry cycle portion of the test, the following deviations were noted: Black Panel Temperature was 70° C. and Chamber Temperature was 47° C. Gloss and color change of the weathered test panels were measured at various time intervals.

Water Resistance—Visual Method

The prepared test panel was submerged in 2 inches of distilled water. The time for the coating to visually change in color or opacity was recorded. This is known as Water Resistance Time.

Water Resistance—Colorimeter Method

The color of the prepared test panel was measured before and after submerging in distilled water for 18 hours at 21° C. using the MA6811 spectrophotometer at a 45° angle with a D65/10 light source. The color change (ΔE) between before and after immersion was then determined (Water Resistance ΔE).

Results are listed in the Tables below.

TABLE 1

| Aerosol Composition | Water Resistance Time (Minutes) |
|---|---|
| Example 2 | >1440 |
| Comparative A | 50 |
| Comparative C | 40 |

TABLE 2

| Aerosol Composition | Silane-Terminated | Weight Average Molecular Weight (g/mol) | Water Resistance (ΔE) | Initial 60 Degree Gloss |
|---|---|---|---|---|
| Example 1 | No | 61,300 | 4.1 | 83.4 |
| Example 2 | Yes | 31,000 | 1.8 | 84.9 |
| Example 3 | Yes | 14,900* | 3.1 | 85.6 |
| Example 4 | Yes | 8,800* | 5.4 | 84.9 |
| Comparative A | No | 21,200 | 59.2 | 75.4 |
| Comparative B | No | 35,100 | 33.3 | 85.7 |

*calculated pre-crosslinking molecular weight

TABLE 3

| Weathering | % Gloss Change* | | ΔE | |
|---|---|---|---|---|
| Time | Example 2 | Comparative A | Example 2 | Comparative A |
| 389 hours | 0 | -1.7 | 0.16 | 0.60 |
| 1459 hours | 1.2 | -4.5 | 0.10 | 0.61 |
| 3239 hours | -0.6 | -13.2 | 0.21 | 0.59 |
| 4620 hours | -7.1 | -29.9 | 0.10 | 0.44 |

*negative values indicate loss of gloss

All patents and patent applications mentioned above are hereby expressly incorporated by reference. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the following claims and their equivalents.

What is claimed is:

1. A polyurethane aerosol composition comprising:
    (a) a polyurethane polymer obtained from steps comprising
        (i) reacting a mixture comprising a polyol or thiol having isocyanate-reactive functional groups with a diisocyanate to form an isocyanate-terminated polyurethane prepolymer, and
        (ii) reacting the isocyanate-terminated polyurethane prepolymer sequentially with an anionic water-solubilizing compound, a neutralization compound to neutralize the anionic groups of the water-solubilizing compound, and an isocyanate-reactive silane compound;
    (b) water; and
    (c) a propellant.

2. The composition of claim 1, wherein the isocyanate-reactive silane compound has the formula $$(R^2O)_3SiR^3-Z,$$

where
   $R^2$ is hydrogen or a $C_1$-$C_4$ alkyl,
   $R^3$ is divalent alkylene, alkylarylene or oxyalkylene, and
   Z is —OH, —SH, —NHR$^4$ or —NH$_2$, where $R^4$ is an aromatic or aliphatic cyclic group.

3. The composition of claim 1, wherein the anionic water-solubilizing compound has the formula $$(HB)_2R^1A,$$

where
   B is O, S, NH or NR, where R is an alkyl group comprising 1 to 4 carbon atoms,
   $R^1$ is a trivalent organic linking group having a valency of at least 3 and from 2 to 25 carbon atoms, and
   A is an anionic group selected from —OSO$_3$M, —CO$_2$M, and —OPO(OM)$_2$, where M is H or a soluble monovalent or divalent cation.

4. The composition of claim 1, wherein the water is present in an amount ranging from 50 to 90 weight percent based on the overall weight of the composition excluding the propellant.

5. The composition of claim 1, wherein the water is present in an amount ranging from 70 to 85 weight percent based on the overall weight of the composition excluding the propellant.

6. The composition of claim 1, wherein the propellant is present in an amount ranging from 10 to 40 weight percent based on the overall weight of the composition.

7. The composition of claim 1, wherein the propellant comprises dimethyl ether.

8. The composition of claim 1, wherein the polyurethane polymer comprises a urea moiety obtained by further reacting the isocyanate-terminated polyurethane prepolymer with an isocyanate-reactive chain extender.

9. The composition of claim 8, wherein the isocyanate-reactive chain extender is hydrazine or a hydrazide.

10. The composition of claim 9, wherein the hydrazide is selected from carbodihydrazide, oxalic dihydrazide, thiocarbohydrazide, or a dihydrazide having the following formula:

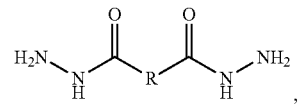

where R is a covalent bond, a heteroatom, or a divalent organic radical.

11. The composition of claim 1, further comprising a rheology modifier.

12. The composition of claim 11, wherein the rheology modifier is a thickener that includes a urethane block copolymer.

13. The composition of claim 12, wherein the urethane block copolymer is a hydrophobically modified ethylene oxide-based urethane block copolymer.

14. The composition of claim 11, wherein the rheology modifier is present in an amount ranging from 0.1 to 5 weight percent based on the overall weight of the composition.

15. The composition of claim 1, further comprising a defoaming agent.

16. The composition of claim 15, wherein the defoaming agent includes a modified polyol.

17. The composition of claim 15, wherein the defoaming agent is present in an amount ranging from 0.01 to 1.2 weight percent based on the overall weight of the composition.

18. The composition of claim 1, further comprising a pigment.

19. A method of providing a crosslinked polyurethane coating on a substrate from a one-part composition, the method comprising:
    depositing the polyurethane aerosol composition of claim 1 onto the substrate through an aerosol actuator; and
    removing the water to produce a crosslinked polyurethane coating.

* * * * *

UNITED STATES PATENT AND TRADEMARK OFFICE
CERTIFICATE OF CORRECTION

PATENT NO. : 10,160,864 B2
APPLICATION NO. : 15/321085
DATED : December 25, 2018
INVENTOR(S) : Susan Endle et al.

Page 1 of 1

It is certified that error appears in the above-identified patent and that said Letters Patent is hereby corrected as shown below:

In the Specification

Column 5
Line 38, delete "diisocyantes" and insert -- diisocyanates --, therefor.

Column 6
Line 40, delete "trimethlyolpropane." and insert -- trimethylolpropane. --, therefor.

Column 8
Line 24, delete "diisocyanante(s)" and insert -- diisocyanate(s) --, therefor.
Line 30, delete "diisocyanantes." and insert -- diisocyanates. --, therefor.
Line 30, delete "diisocyanante)" and insert -- diisocyanates) --, therefor.

Column 10
Lines 14-15, delete "methyidiethoxysilane;" and insert -- methyldiethoxysilane; --, therefor.
Line 66, delete "heteratom" and insert -- heteroatom --, therefor.

Column 12
Line 36, Delete "13,13" and insert -- $\beta,\beta$ --, therefor.
Line 47, Delete "Rotoevaporator" and insert -- Rotary Evaporator --, therefor.

Column 18
Line 46, Delete "heteratom," and insert -- heteroatom, --, therefor.

Column 20
Line 15, Delete "heteratom," and insert -- heteroatom, --, therefor.

Signed and Sealed this
Thirteenth Day of August, 2019

Andrei Iancu
*Director of the United States Patent and Trademark Office*